United States Patent [19]

Doi et al.

[11] 4,398,292

[45] Aug. 9, 1983

[54] METHOD AND APPARATUS FOR ENCODING DIGITAL WITH TWO ERROR CORRECTING CODES

[75] Inventors: Toshitada Doi; Kentarou Odaka, both of Tokyo, Japan

[73] Assignee: Sony Corporation, Tokyo, Japan

[21] Appl. No.: 237,487

[22] Filed: Feb. 23, 1981

[30] Foreign Application Priority Data

Feb. 25, 1980 [JP] Japan ................ 55-22605

[51] Int. Cl.³ .......................................... G06F 11/10
[52] U.S. Cl. ....................................................... 371/39
[58] Field of Search ............................ 371/39, 40, 37

[56] References Cited

U.S. PATENT DOCUMENTS

| | | | |
|---|---|---|---|
| 3,745,528 | 7/1973 | Patel | 371/38 |
| 4,206,440 | 6/1980 | Doi et al. | 371/39 |
| 4,214,228 | 7/1980 | Nara et al. | 371/40 |
| 4,238,852 | 12/1980 | Iga et al. | 371/40 |
| 4,306,305 | 12/1981 | Doi et al. | 371/40 X |

*Primary Examiner*—David H. Malzahn
*Attorney, Agent, or Firm*—Lewis H. Eslinger; Alvin Sinderbrand

[57] ABSTRACT

Successive data words are distributed to a plurality of respective channels to form successive data blocks, each data block being comprised of the data words in the plural channels. A first error correcting code is generated as a function of the words included in the data block, this first error correcting code being adapted for use in correcting at least one word which may be erroneous in the data block, as when the data block subsequently is received or reproduced. The data words included in the data block are selectively delayed, by different respective time delays, to form a time-interleaved data block comprised of time-interleaved data words. A second error correcting code is generated as a function of the words included in the time-interleaved data block, this second error correcting code being adapted for use in correcting at least one word which may be erroneous in the time-interleaved data block, as when the time-interleaved data block subsequently is received or reproduced. The first and second error correcting codes and the time-interleaved data block are combined to form a transmission block which may be transmitted or recorded on a suitable record medium.

25 Claims, 5 Drawing Figures

METHOD AND APPARATUS FOR ENCODING DIGITAL WITH TWO ERROR CORRECTING CODES

BACKGROUND OF THE INVENTION

This invention relates to a method and apparatus for transmitting digital data words in an error-correction format and, more particularly, to a method and apparatus whereby the error-correction ability of the transmitted information is improved.

Various error-correction encoding techniques have been proposed for use in transmitting and/or recording digital data. For example, digital data in the form of data words, such as pulse code modulated (PCM) signals, when transmitted or recorded, may be subjected to errors known as random and burst errors. A random error distorts or destroys isolated bits of the PCM signal. A burst error distorts or destroys one or more data words included in the PCM signal. Although relatively simple error-correction techniques, such as the use of parity words to accompany the PCM signal, are known to be useful in correcting random errors, more sophisticated error-correction encoding techniques are needed in order to correct burst errors.

In one technique which has been proposed, data words, such as PCM words, are encoded in a so-called time-interleaved format. That is, successive PCM words $X_0, X_1, X_2, \ldots X_{k-1}$ are distributed to respective ones of k channels. These PCM words $X_0 \ldots X_{k-1}$ thus appear as parallel words. Each word, or each channel, is subjected to a time delay of a respectively different amount. For example, PCM word $X_0$ is delayed by a delay time $D_0$, PCM word $X_1$ is delayed by a delay time of $D_1$, and so on, with PCM word $X_{k-1}$ delayed by the time delay $D_{k-1}$. These time delays result in a time-interleaving effect, with delayed PCM word $X_0$ being represented as $Y_0$, delayed PCM word $X_1$ being represented as $Y_1$, and so on, with delayed word $X_{k-1}$ being represented as $Y_{k-1}$. That is, delayed PCM words $Y_0 \ldots Y_{k-1}$ exhibit a time-interleaved relationship. A parity word $P_x$ is produced in response to the original, undelayed PCM words $X_0 \ldots X_{k-1}$. As one example thereof, the parity word $P_x$ is produced by supplying, on a bit-by-bit basis, all of the PCM words $X_0 \ldots X_{k-1}$ to a modulo-2 adder. The output of this adder is the parity word $P_x$ having the same number of bits as the bits which constitute each PCM word. Another parity word $R_y$ is produced in response to the time-interleaved PCM words $Y_0 \ldots Y_{k-1}$. That is, these time-interleaved PCM words are supplied to yet another modulo-2 adder, the output of which is the parity word $R_y$. The first-mentioned parity word $P_x$ is delayed by a suitable time delay $D_k$, resulting in a delayed parity word $P_y$. Now, the time-interleaved PCM words $Y_0 \ldots Y_{k-1}$, together with the delayed parity word $P_y$ and the second-mentioned parity word $R_y$ are transmitted as a transmission block. This transmission block may be transmitted in parallel-by-word form or, preferably, in seriatum. A synchronizing signal SYNC is inserted into this transmission block as the first word thereof; and then this transmission block may be transmitted or recorded on a suitable record medium.

When the time-interleaved encoded information of the foregoing type is reproduced, the transmission block, formed of PCM words $Y_0 \ldots Y_{k-1}$, and the parity words $P_y$ and $R_y$ are recovered and are supplied in separate channels, as by a suitable distributing device, such as a demultiplexer. If an error is present in any one of the recovered PCM words $Y_0 \ldots Y_{k-1}$, this error can be corrected in accordance with the parity word $R_y$, as is known to those of ordinary skill in the art. That is, conventional parity-error-correction techniques can be used to correct an error which may be present in one of these PCM words. Then, once the erroneous PCM word is corrected, the PCM words $Y_0 \ldots Y_{k-1}$ are time-deinterleaved. The parity word $P_y$ is delayed by an amount sufficient to cancel the original time delay which was imparted during the encoding process; thereby recovering the parity word $P_x$. The time-deinterleaving process is obtained by delaying each of the recovered PCM words $Y_0 \ldots Y_{k-1}$ by an amount sufficient to cancel the original delays $D_0, D_1, \ldots D_{k-1}$ which had been used in the time-interleaving encoding process. Thus, the original PCM words $X_0 \ldots X_{k-1}$, exhibiting the original time relationship, is obtained. Any error which may be present in one of these PCM words is corrected in accordance with conventional parity-error-correction techniques by using the recovered parity word $P_x$.

While the foregoing time-interleaving encoding technique generally operates in a satisfactory manner, that is, it is capable of correcting burst errors which may be present in the reproduced time-interleaved PCM words $Y_0 \ldots Y_{k-1}$ due to the inherent dispersal of such errors in different time-deinterleaved blocks, error correction is inhibited if the parity word $R_y$ or the parity word $P_y$ is erroneous. This difficulty is overcome by another technique described generally in U.S. application Ser. No. 31,030, filed Apr. 18, 1979. As described in this application, the delayed parity word $P_y$, which is derived from the original PCM words $X_0 \ldots X_{k-1}$, is supplied to the modulo-2 adder as the time-interleaved PCM words $Y_0 \ldots Y_{k-1}$. Hence, the second-mentioned parity word $R_y$ is derived as a function of the time-interleaved PCM words and also the delayed parity word $P_y$. Consequently, if, during reproduction, the reproduced parity word $P_y$ is erroneous, this error can be corrected by using the parity word $R_y$ in accordance with conventional parity-error-correction techniques. This means that, once the parity word $P_y$ is corrected, the time-deinterleaved PCM words $X_0 \ldots X_{k-1}$, recovered from the reproduced time-interleaved PCM words, may be error-corrected.

However, in the time-interleaved error correction coding technique described in the aforementioned application, if the parity word $P_y$ and also a PCM word in a recovered time-interleaved block both are erroneous, the parity word $P_y$ cannot be corrected. Furthermore, if two words in two successive recovered time-interleaved blocks are erroneous, the recovered time-deinterleaved words cannot be corrected. The possibility of the occurrence of such errors to prevent error correction is reduced in accordance with the technique disclosed in copending application Ser. No. 123,721, filed Feb. 22, 1980. In this latter application, the parity word $R_y$ is delayed and fed back to the first-mentioned modulo-2 adder, such that the parity word $P_x$ is derived from the PCM words $X_0 \ldots X_{k-1}$, together with the delayed parity word $R_y$. As a result of this arrangement, many errors which may occur in the reproduced parity word $R_y$ now may be corrected by using parity word $P_x$ and conventional parity-error-correction techniques. Consequently, the error correcting ability of this encoding arrangement is markedly improved.

Nevertheless, one disadvantage which is common to all of the foregoing time-interleaved error correction techniques is the ability to correct only a single erroneous word (be it a PCM word or a parity word) included in any given block. That is, only one erroneous word in the recovered time-interleaved block may be corrected and, similarly, only one erroneous word in the time-deinterleaved block may be corrected. A burst error having a substantial duration so as to exceed the inherent dispersal thereof due to the time-interleaving arrangement will, therefore, distort two or more words which are present in the same time-deinterleaved block. To improve the dispersal effect of such prolonged burst errors, it has been found advantageous to impart additional delays to the PCM words $Y_0 \ldots Y_{k-1}$, as well as to the parity words $P_y$ and $R_y$. This results in a further interleaved effect. Also, an error detecting code, such as the cyclic redundancy check (CRC) code is derived from the further interleaved words, and this CRC code is added to the interleaved words, all of which are transmitted as a transmission block. An example of this technique is described in copending application Ser. No. 195,625, filed Oct. 9, 1980. However, by using a CRC code, the available "data slots" for useful information, that is, for the PCM words, is reduced. That is, in order to achieve improved error correction, it is necessary to transmit relatively "redundant" information, that is, it is necessary to transmit error-correction parity words and an error-detection CRC code, none of which represents useful information.

Techniques have been proposed whereby the CRC code need not be transmitted. Such techniques employ the so-called b-adjacent code, the BCH (Bose-Chaudhuri-Hocqueghem) code or the like as a parity word, such as described in U.S. Pat. No. 3,629,824 or in U.S. Pat. No. 3,697,948. In accordance with these techniques, any word in a block can be corrected without first identifying the particular word that is erroneous. However, this technique generally is limited to errors which occur only in a single block. Furthermore, the parity code generally exhibits a significant redundancy in each block; thereby further limiting the data slots which are available for useful information.

There is, therefore, a need to provide an error-correction encoding technique in which error-correction codes, or words, such as parity words, are not highly redundant and, moreover, the encoded information need not be accompanied by an error-detection code, such as the CRC code. There also is a need for such an error-correction encoding technique which is relatively simple to implement.

OBJECTS OF THE INVENTION

Therefore, it is an object of the present invention to provide an improved method and apparatus for encoding digital information, such as data words, in an error-correction format which overcomes the aforenoted disadvantages of prior techniques, but which exhibits favorable error-correction abilities.

Another object of this invention is to provide an improved method and apparatus for encoding data words, such as PCM words, the encoded data being capable of transmission or recording with improved error-correction ability.

A further object of this invention is to provide an improved error-correction encoding technique for use with, for example, a PCM signal, wherein several PCM signals constitute a block, and wherein one or two words in that block can be fully corrected merely by using parity words, and without requiring the use of CRC code words.

A still further object of this invention is to provide an improved error-correction encoding technique for use with PCM words, this technique exhibiting favorable error correction abilities without requiring highly redundant error-correction codes.

Yet another object of this invention is to provide improved apparatus for carrying out the aforementioned technique, which apparatus is relatively simple and inexpensive.

Various other objects, advantages and features of the present invention will become readily apparent from the ensuing detailed description, and the novel features will be particularly pointed out in the appended claims.

SUMMARY OF THE INVENTION

In accordance with this invention, an improved error-correction encoding technique is provided for use with digital data words. Successive data words are distributed to a plurality of respective channels to form successive data blocks, each data block being comprised of the data words in the plural channels. A first error correcting code is generated as a function of the words included in the data block, this first error correcting code being adapted for use in correcting at least one word which may be erroneous in the data block, as when the data block is received or reproduced from a record medium. The data words included in this data block are selectively delayed, by different respective time delays, to form a time-interleaved data block comprised of time-interleaved data words. A second error correcting code is generated as a function of the words included in the time-interleaved data block, this second error correcting code being adapted for use in correcting at least one word which may be erroneous in the time-interleaved data block, as when the time-interleaved data block is received or reproduced. The first and second error correcting codes, as well as the time-interleaved data block, all are combined into a transmission block which then may be transmitted or recorded.

BRIEF DESCRIPTION OF THE DRAWINGS

The following detailed description, given by way of example, will best be understood in conjunction with the accompanying drawings in which.

DETAILED DESCRIPTION OF A CERTAIN PREFERRED EMBODIMENT

Figure 1:
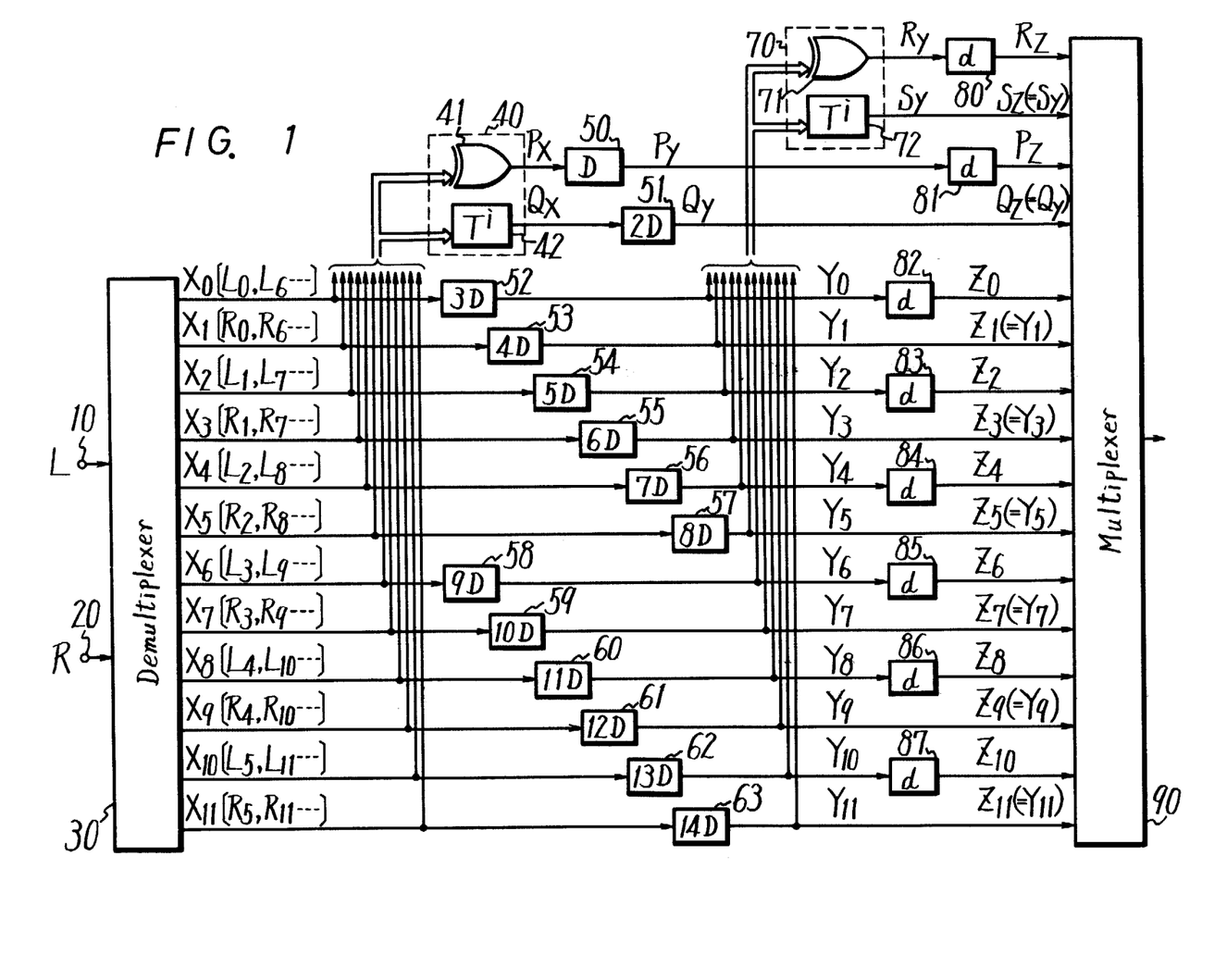
FIG. 1 is a block diagram of one embodiment of the present invention.

Referring now to the drawings, wherein like reference numerals are used throughout, and in particular to FIG. 1, there is illustrated a block diagram of one embodiment of apparatus which is capable of carrying out the encoding technique of the present invention. As will be described, this embodiment is particularly adapted to encode digitized stereophonic audio signals, and is particularly advantageous for use with a recorder, such as a rotary-head type recorder (e.g. a video tape recorder) by which such digitized audio signals can be recorded on a suitable record medium. Although not shown herein, it is assumed that the digitized stereophonic audio signals supplied to the apparatus shown in FIG. 1 are produced by suitable digital-to-analog converting circuitry which functions to sample the analog audio signal and to digitize each sample in, for example, pulse code modulation (PCM) format. Hence, the apparatus shown in FIG. 1 is supplied with successive digital data words, such as PCM words, each such word being a digitized version of the sampled audio signal. For convenience, the embodiment shown in FIG. 1 is illustrated as including a pair of input terminals 10 and 20 adapted to receive left-channel and right-channel data words, respectively. In an alternative embodiment, the encoding apparatus is supplied with a single channel of left and right (L and R) data words, these left and right data words then being distributed to separate left and right channels.

The illustrated embodiment is comprised of a distributing circuit 30, such as a demultiplexer, an error correcting code generator 40, a plurality of time delay circuits 50, 51, . . . 62, 63, another error correcting code generator 70, and a plurality of additional time delay circuits 80, 81, . . . 86, 87. The illustrated apparatus also is provided with a multiplexer 90 which, as will be described, serves to combine several channels of digital words into a single, multiplexed channel of serial digital words. Distributing circuit, or demultiplexer, 30 has a pair of inputs coupled to input terminals 10 and 20 to receive the left-channel and right-channel data, or PCM words representing successive samples of the left-channel and right-channel audio signal. The distributing circuit serves to distribute the successive data words supplied thereto via input terminal 10 to a plurality of respective channels illustrated, for example, as channels $X_0$, $X_2$, $X_4$, $X_6$, $X_8$ and $X_{10}$. Only left-channel PCM words are provided on these plural channels. Similarly, distributing circuit 30 is adapted to distribute successive right-channel PCM words to a plurality of respective channels identified as channels $X_1$, $X_3$, $X_5$, $X_7$, $X_9$ and $X_{11}$. It will be appreciated that only right-channel PCM words are provided on these latter channels.

It may be appreciated that successive left-channel and right-channel PCM words are supplied to distributing circuit 30 in successive time periods. Let it be assumed that the time period occupied by a PCM word supplied to the distributing circuit is represented as D. The distributing circuit preferably includes suitable storage and gating circuitry such that, after, for example, six left-channel PCM words and six right-channel PCM words have been received, a total number of twelve PCM words (six for each channel) are provided in channels $X_0 \ldots X_{11}$. These twelve PCM words occur during a unit data word time period D, and the combination of such PCM words in these channels during such unit data word period is referred to as a data block. Thus, one data block may be comprised of left-channel and right-channel PCM words $[L_0,R_0,L_1,R_1,L_2,R_2,L_3,R_3,L_4,R_4,L_5,R_5]$, the next-following data block is comprised of left-channel and right-channel PCM words $[L_6,R_6,L_7,R_7,L_8,R_8,L_9,R_9,L_{10},R_{10},L_{11},R_{11}]$, and so on. Thus, it is appreciated that channel $X_0$ is provided with successive left-channel PCM words $L_0, L_6, L_{12}, \ldots$; channel $X_1$ is provided with successive right-channel PCM words $R_0, R_6, R_{12}, \ldots$; channel $X_2$ is provided with successive left-channel PCM words $L_1, L_7, L_{13} \ldots$; and so on. That is, each channel $X_0 \ldots X_{11}$ is provided with a respective left-channel or right-channel PCM data series, with each PCM word included in that series being the digitized version of a corresponding sample of the left-channel or right-channel analog audio signal, respectively.

In the embodiment of FIG. 1, the left-channel and right-channel PCM series are provided at the output of distributing circuit 30 parallel-by-word. Each word may appear serially-by-bit or, if desired, each channel at the output of the distributing circuit may, in fact, be comprised of parallel leads such that each PCM series $X_0 \ldots X_{11}$ is provided parallel-by-bit. In either arrangement, that is, whether each PCM series appears serially-by-bit or parallel-by-bit, each PCM word may be formed of, for example, sixteen bits.

Channels, or PCM series, $X_0 \ldots X_{11}$ at the outputs of distributing circuit 30 are coupled to error correcting code generator 40. It may be appreciated that each data block is supplied, parallel-by-word, to this error correcting code generator. In the illustrated embodiment, error correcting code generator 40 is adapted to produce two error correcting words, represented as $P_x$ and $Q_x$. Error correcting word $P_x$ is generated by a parity word generator 41, and error correcting word $Q_x$ is generated by a parity matrix word generator 42. It will be appreciated that, if desired, other error correcting word generators may be used to produce suitable error correcting code words $P_x$ and $Q_x$.

Let it be assumed that channels $X_0, X_1, \ldots X_{11}$ are provided with PCM words $W_0, W_1, \ldots W_{11}$, respectively, in each successive data block. It is recognized that, in one data block, words $W_0, W_1, \ldots W_{11}$ are formed of left-channel and right-channel PCM words $[L_0,R_0, \ldots R_5]$, in the next-following data block, these words are formed of left-channel and right-channel PCM words $[L_6,R_6, \ldots R_{11}]$, and so on. Words $W_0, W_1, \ldots W_{11}$ in a given data block are supplied in parallel to parity word generator 41. This parity word generator preferably includes a modulo-2 adder for summing the data words supplied thereto in modulo-2 form. As a result thereof, error correcting word $P_x$ is a parity word that is a function of the data words supplied to the parity word generator, and may be expressed as:

$$P_x = W_0 \oplus W_1 \oplus W_2 \oplus \cdots \oplus W_{11} \qquad (1)$$

Parity matrix word generator 42 likewise is supplied with data words $W_0, W_1, \ldots W_{11}$, parallel-by-word, and is adapted to generate the matrix parity word $Q_x$ in response thereto. As one example thereof, parity matrix word generator 42 may be a b-adjacent encoder which serves to multiply the respective data words $W_0 \ldots W_{11}$ supplied thereto with a predetermined generation matrix $[T]$, which matrix may be expressed as $T, T^2, \ldots T^{11}$. That is, this generation matrix is comprised of the distinct non-zero elements of the Galois Field $(2^b)$. In addition, parity matrix word generator 42 serves to sum the multiplied data words by modulo-2 addition. Thus, the matrix parity word $Q_x$ produced by error correcting word generator 42 may be expressed as:

$$Q_x = W_0 \oplus TW_1 \oplus T^2 W_2 \oplus \cdots \oplus T^{11} W_{11} \qquad (2)$$

Parity word $P_x$ and matrix parity word $Q_x$, both produced by error correcting code generator 40, as well as the respective words included in a common data block in channels $X_0 \ldots X_{11}$ all are time delayed by respectively different amounts by a time delay circuit. This time delay circuit is comprised of individual delay circuits 50, 51, 52, . . . 62 and 63. Each of these individual time delay circuits imparts a time delay to the word supplied thereto, which time delay is equal to a multiple of D (wherein, it is recalled, D is the time period occupied by a respective data or PCM word). In the illustrated embodiment, time delay circuit 50 delays the parity word $P_x$ by the amount D, resulting in a delayed parity word $P_y$. Time delay circuit 51 delays the matrix parity word $Q_x$ by the amount 2D to produce the delayed matrix parity word $Q_y$. Time delay circuit 52 delays the PCM words provided in channel $X_0$ by the amount 3D to produce a delayed channel $Y_0$ of PCM words. Time delay circuit 53 delays the PCM words in channel $X_1$ by the amount 4D to produce the delayed channel $Y_1$ of PCM words. Likewise, time delay circuits 54, 55, . . . 63 delay the PCM words in channels $X_2$, $X_3 \ldots X_{11}$, respectively, by the amounts 5D, 6D . . . 14D to produce the delayed channels $Y_2, Y_3 \ldots Y_{11}$.

Although this embodiment delays the error correcting words $P_x$ and $Q_x$ by smaller time delays relative to the delays imparted to the PCM words, it is appreciated that, if desired, the error-correcting words may be delayed by time delays which are greater than the delays imparted to these PCM words. Also, delays of different amounts than the illustrated multiples of a data word period may be used. It is recognized that, as a result of the illustrated delays, the PCM words in channels $Y_0 \ldots Y_{11}$ exhibit a time-interleaved relationship with each other, as will be described in greater detail below.

As one example thereof, if it is assumed that each PCM word included in a data block is a 16-bit word, then parity word $P_x$ and matrix parity word $Q_x$, produced in response to these 16-bit words, also will be formed of 16 bits. As an alternative, each parity and matrix parity word $P_x$ and $Q_x$ may be formed of 8 bits. This is attained by dividing each 16-bit word W into two 8-bit words $W_a$ and $W_b$. Then, rather than supplying twelve 16-bit words to parity word generator 41 and to parity matrix generator 42, twenty-four 8-bit words are supplied thereto. In this embodiment, equations (1) and (2) may be revised as follows:

$$P_x = W_{0a} \oplus W_{0b} \oplus W_{1a} \oplus W_{1b} \oplus W_{2a} \oplus W_{2b} \oplus \cdots \oplus W_{11a} \oplus W_{11b} \qquad (3)$$

$$Q_x = W_{0a} \oplus TW_{0b} \oplus T^2 W_{1a} \oplus T^3 W_{1b} \oplus T^4 W_{2a} \oplus T^5 W_{2b} \oplus \cdots \oplus T^{21} W_{11a} \oplus T^{22} W_{11b} \qquad (4)$$

From equations (3) and (4), it is appreciated that parity word $P_x$ and matrix parity word $Q_x$ each is formed of 8 bits. Hence, rather than using two separate 16-bit error correcting words, a single 16-bit error correcting word may be formed, the first 8 bits of this 16-bit error correcting word constituting the 8-bit parity word $P_x$ and the next 8 bits constituting the 8-bit matrix parity word $Q_x$.

As another alternative, each channel $X_0 \ldots X_{11}$ may be provided with an 8-bit word, rather than the aforedescribed 16-bit word. Nevertheless, if each PCM word representing a sample of the left-channel or right-channel analog audio signal is comprised of 16 bits, this 16-bit word may be divided into two 8-bit words, with one of these 8-bit words being provided in, for example, channel $X_0$ and the other 8-bit word being provided in channel $X_1$. In general terms, if successive PCM words are represented as $W_0, W_1, \ldots W_5$, wherein ($W_0 = L_0$), ($W_1 = R_0$), ($W_2 = L_1$), ($W_3 = R_1$), ($W_4 = L_2$), and ($W_5 = R_2$), then channel $X_0$ is provided with 8-bit word $W_{0a}$, channel $X_1$ is provided with 8-bit word $W_{0b}$, channel $X_2$ is provided with 8-bit word $W_{1a}$, . . . and channel $X_{11}$ is provided with 8-bit word $W_{5b}$. The 8-bit words $W_{0a}, W_{0b}, \ldots W_{5a}, W_{5b}$ constitute one data block. The next-following data block is formed of 8-bit words $W_{6a}, W_{6b}, W_{7a}, W_{7b} \ldots W_{11a}, W_{11b}$, these 8-bit words being provided in channels $X_0, X_1, X_2, X_3 \ldots X_{10}$ and $X_{11}$, respectively. With this arrangement, that is, with each channel being provided with an 8-bit word, parity word $P_x$ and matrix parity word $Q_x$ also may be 8-bit words and may be expressed as:

$$P_x = W_{0a} \oplus W_{0b} \oplus W_{1a} \oplus W_{1b} \oplus \cdots \oplus W_{5a} \oplus W_{5b} \qquad (5)$$

$$Q_x = W_{0a} \oplus TW_{0b} \oplus T^2 W_{1a} \oplus T^3 W_{1b} \oplus \cdots \oplus T^{10} W_{5a} \oplus T^{11} W_{5b} \qquad (6)$$

Regardless of the particular embodiment which is adopted, that is, whether the embodiment represented by equations (1), (2) or equations (3), (4) or equations (5), (6) is employed, it is appreciated that time delay circuits 50, 51 . . . 63 impart suitable delays to the partiy and matrix parity words, and also to the PCM words, resulting in delayed error correcting words $P_y$ and $Q_y$, and delayed channels $Y_0 \ldots Y_{11}$, whereby the delayed error correcting and PCM words exhibit a time-interleaved relationship with respect to eahc other. The time-interleaved PCM words in channels $Y_0 \ldots Y_{11}$ constitute a time-interleaved data block. These time-interleaved PCM words in channels $Y_0 \ldots Y_{11}$ are supplid, parallel-by-word, to error correcting code generator 70.

In the illustrated embodiment, error correcting code generator 70 is similar to aforedescribed error correcting code generator 40 and, therefore, may include a relatively simple parity word generator 71 and a parity matrix generator 72. Parity word generator 71 functions to sum the PCM words included in the time-interleaved data block in channels $Y_0 \ldots Y_{11}$ by modulo-2 addition to produce a second parity word $R_y$. Parity matrix generator 72 serves to multiply the respective PCM words included in this time-interleaved data block by a predetermined generation matrix, and then sum the products of this multiplication by modulo-2 addition to produce a second matrix parity word $S_y$. Thus, it is seen that error correcting words $P_x$ and $Q_x$ are associated with the original data blocks formed at the output of distributing circuit 30, and error correcting words $R_y$ and $S_y$ are associated with the time-interleaved data blocks.

If desired, error correcting code generator 70 may include different encoding circuitry to produce error correcting words $R_y$ and $S_y$ which are of a different type, or format, from the error correcting words $P_x$ and $Q_x$ produced by error correcting code generator 40. Nevertheless, error correcting code generator 70 may be of conventional construction.

In the embodiment shown in FIG. 1, additional time delay circuits 80, 81, . . . 87 are provided to impart additional time delays to selected ones of the error correcting words $P_y, A_y, R_y$ and $S_y$, and also to selected ones of the time-interleaved PCM words which are provided in channels $Y_0 \ldots Y_{11}$. These additional time delay circuits all impart an equal time delay d, wherein d is a fraction of the data word period D. As one example thereof, d equals D/8. It may be appreciated that, where each PCM word is formed of 16 bits, the additional time delay d is equal to the period occupied by 2 bits. In the illustrated embodiment, it is appreciated that the error correcting and PCM words all are time-interleaved with respect to each other, and the additional time delay d is imparted to alternate ones of these time-interleaved words. Specifically, parity words $P_y$ and $R_y$ are subjected to additional time delays d by time delay circuits 80 and 81, respectively, and the time-interleaved PCM words in channels $Y_0$, $Y_2$, $Y_4$, $Y_6$, $Y_8$ and $Y_{10}$ are subjected to additional delays d by time delay circuits 82, 83, 84, 85, 86 and 87, respectively.

As a result of these selective, additional delays, the series of error-correcting words are represented as $P_z$, $Q_z$, $R_z$ and $S_z$, respectively. Likewise, the resultant, time-interleaved PCM words are represented as PCM series $Z_0$, $Z_1$, ... $Z_{11}$, respectively. Nevertheless, these error correcting and PCM words all exhibit a time-interleaved relationship with respect to each other and, in combination, constitute a transmission block. This transmission block is supplied, paralel-by-word, to multiplexer 90.

Figure 2:
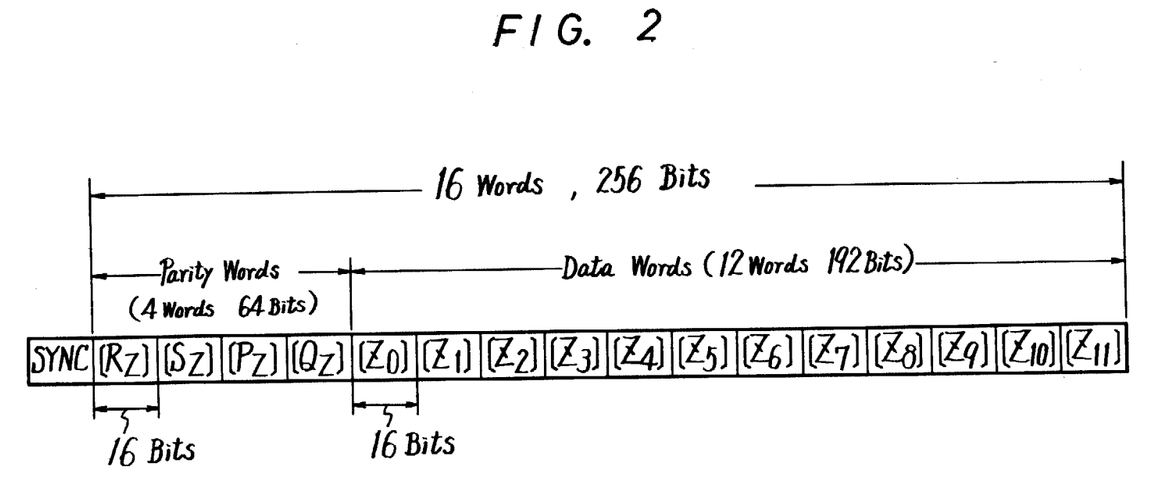
FIG. 2 is a representation of a transmission block which is produced by the embodiment shown in FIG. 1.

Multiplexer 90 functions to serialize the time-interleaved words included in eahc successive transmission block supplied thereto. That is, the multiplexer functions as a parallel-to-serial converter, thereby serializing the transmission block. One example of a serialized transmission is illustrated in FIG. 2. Although not shown herein, a synchronizing signal SYNC is inserted in advance of the serialized transmission block this synchronizing signal then being followed by the four error correcting words $R_z$, $S_z$, $P_z$ and $Q_z$, and these error correcting words then are followed by twelve time-interleaved PCM words represented as $Z_0$, $Z_1$, ... $Z_{11}$. Thus, each transmission block includes sixteen words, and if each word is formed of 16 bits, the serialized transmission block includes 256 bits plus the SYNC word.

Returning to FIG. 1, if it is assumed that the original data block provided at the output of distributing circuit 30 is formed of left-channel and right-channel PCM words $[L_0, R_0, L_1, R_1, L_2, R_2, L_3, R_3, L_4, R_4, L_5, R_5]$ in channels $X_0 \ldots X_{11}$, respectively, then, at the time that this data block occurs, the corresponding left-channel and right-channel PCM words included in the transmission block in channels $Z_0 \ldots Z_{11}$ supplied to multiplexer 90 may be expressed as $[L_{0-6(3D+d)}, R_{0-24D}, L_{1-6(5D+d)}, R_{1-36D}, L_{2-6(7D+d)}, R_{2-48D}, L_{3-6(9D+d)}, R_{3-60D}, L_{4-6(11D+d)}, R_{4-72D}, L_{5-6(13D+d)}, R_{5-84D}]$. This represents the timing relationship between the transmission block that is supplied to multiplexer 90 and the data block that is produced at the output of distributing circuit 30.

Likewise, if it is assumed that the transmission block $[L_0, R_0 \ldots L_5, R_5]$ is produced at the output of distributing circuit 30, and if the parity word $P_x$ is equal to $P_0$, the matrix parity word $Q_x$ is equal to $Q_0$, the parity word $R_y$ is equal to $R_0$ and the matrix parity word $S_y$ is equal to $S_0$, then at this time, the error correcting words $P_z, Q_z, R_z$ and $S_z$ included in the transmission block supplied to multiplexer 90 may be expressed as $P_{0-6(D+d)}$, $Q_{0-12D}$, $R_{0-6D}$ and $S_0$, respectively. This represents the time delayed relationship, or time-interleaving of the error correcting words which are included in a given transmission block.

As mentioned above, it is preferred to utilize multiplexer 90 so as to serialize each transmission block in the format represented by FIG. 2. However, if desired, each error correcting and PMC word included in the transmission block may be reocrded directly on a suitable PCM recorder having, for example, a multiple fixed head. That is, the transmission block may be recorded in parallel tracks on a record medium by a multiple head or a multi-gap head, of a type which is ocnventional. However, by using multiplexer 90, the transmission block may be recorded in a single channel on, for example, a magnetic tape, a suitable record disk, or other record medium conventionally used in PCM recording systems.

It is appreciated that, by selectively delaying alternate words (i.e., alternate error correcting and PCM words) by the time delay d, wherein $d = D/8$, a 16-bit word included in the transmission block, such as the 16-bit word in channel $Z_0$, does not correspond, bit-for-bit, to a sample of the audio signal. Nevertheless, this 16-bit word is referred to herein as a PCM word.

Although not shown herein, it should be appreciated that, when the transmission block that has been recorded on the record medium subsequently is reproduced, the selective delays d are cancelled by, for example, delaying those words which had not been additionally delayed by the amount d. Alternatively, those words which had been delayed by the additional amount d may be delayed, during the reproduction process, by the amount (D-d), and the remaining words may be delayed by the amount D. In any event, the time-interleaved data block $Y_0 \ldots Y_{11}$, together with error correcting words $R_y$ and $S_y$ are recovered with proper timing relationship. Then, if any of the time-interleaved PCM words are erroneous, such errors may be corrected, in accordance with conventional error-correcting techniques, by using the error correcting words $R_y$ and $S_y$. Thereafter, the time-interleaved PCM words in channels $Y_0 \ldots Y_{11}$ are time-deinterleaved by, for example, delaying these PCM words by an amount which is inversely related to the delays imparted by time delay circuits 50 ... 63. Likewise, error correcting words $P_y$ and $Q_y$ are suitably delayed so as to recover error correcting words $P_x$ and $Q_x$ with the same timing relationship as was exhibited between these error correcting words and the original data block. Thereafter, any errors in the time-deinterleaved PCM words may be corrected by using the time-deinterleaved error correcting words $P_x$ and $Q_x$ in accordance with well-known error correction techniques.

An important aspect of the present invention, as illustrated in FIG. 1, is that the use of an error detecting code, which heretofore has been required in error correcting encoding techniques, is avoided. This means that the time slot previously occupied by, for example, a CRC code word now can be occupied by a PCM word. It is appreciated that, by eliminating the need for an error detecting code, the redundancy of the error correction encoded signal is reduced. Stated otherwise, the packing, or recording density for useful information is improved.

Figure 3:
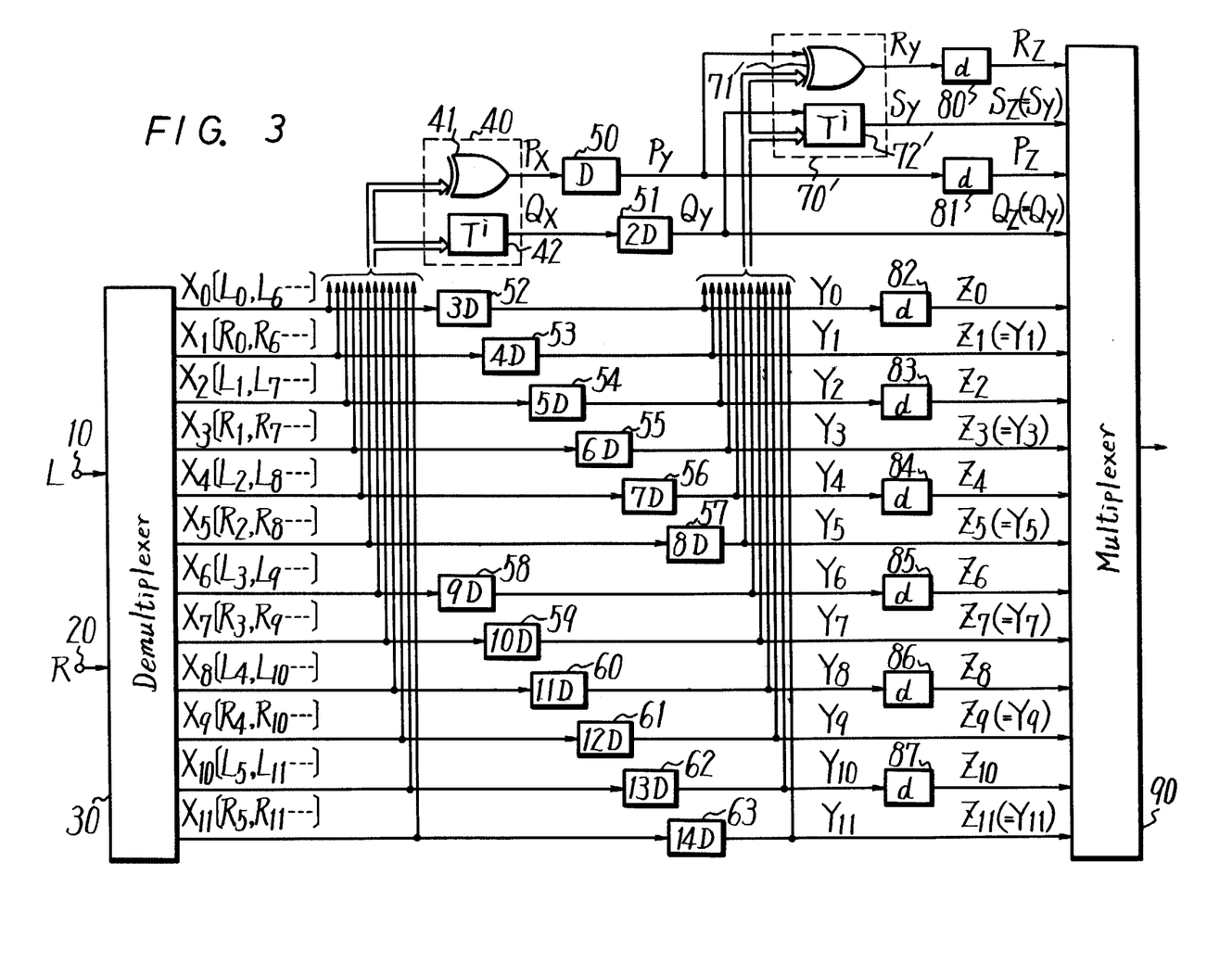
FIGS. 3–5 are block diagrams of other embodiments of the present invention.

Another embodiment of the present invention, which is an improved modification of the embodiment shown in FIG. 1, is illustrated in FIG. 3. The FIG. 3 embodiment differs from that described hereinabove in that the delayed parity word $P_y$ and the delayed matrix parity word $Q_y$ both are supplied to error correcting code generator 70'. In particular, parity word $P_y$ is supplied to parity word generator 71' and matrix parity word $Q_y$ is supplied to parity matrix generator 72'. Consequently, parity word $R_y$ is obtained from the modulo-2 addition of the time-interleaved PCM words in channels $Y_0 \ldots Y_{11}$ with parity word $P_y$. Also, matrix parity word $S_y$ is derived as a function of the multiplication of matrix parity word $Q_y$ with the predetermined generation matrix, and the modulo-2 addition of this product with the product of multiplying the time-interleaved PCM words with the generation matrix. Thus, in the embodiment shown in FIG. 3, parity word $R_y$ is a function of parity word $P_y$ as well as a function of the time-interleaved PCM words, and matrix parity word $S_y$ is a function of matrix parity word $Q_y$ as well as the time-interleaved PCM words.

By using the embodiment shown in FIG. 3, if, during reproduction or reception of the transmission block, parity word $P_y$ or matrix parity word $Q_y$ is erroneous, this error is correctable by using parity word $R_y$ or matrix parity word $S_y$, respectively, in accordance with conventional error correction techniques. It is appreciated that, once error correcting words $P_y$ and $Q_y$ are corrected, any error which may be present in the recovered, orginal data block thus may be corrected. But, if error correcting words $P_y$ and $Q_y$ cannot be corrected, as when the embodiment shown in FIG. 1 is used, an error in the recovered, original data block cannot be corrected. Thus, the embodiment shown in FIG. 3 exhibits a higher error correcting ability than the embodiment shown in FIG. 1.

Figure 4:
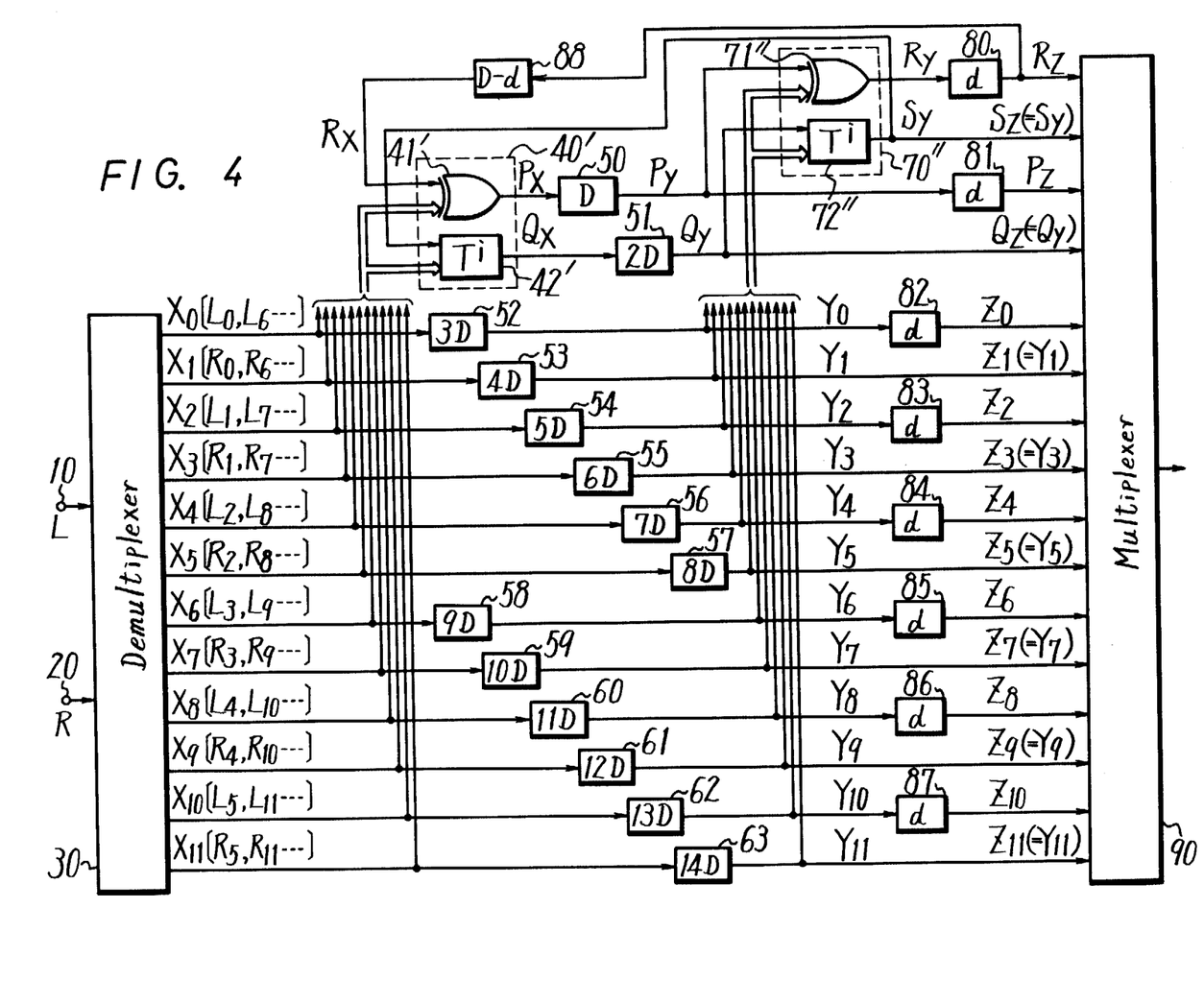

A further improvement over the embodiment shown in FIG. 3 is obtained by utilizing the embodiment shown in FIG. 4. In FIG. 4, parity word $R_y$, generated by parity word generator 71" in error correcting code generator 70", after being additionally delayed by the time delay d is fed back and supplied as the parity word $R_x$ to parity word generator 41' included in error correcting code generator 40'. More particularly, the fed back delayed parity word $R_z$ is supplied through a further time delay circuit 88 so as to be delayed by the amount (D−d). Similarly, the matrix parity word $S_y$ generated by parity matrix generator 72" of error correcting code generator 70" is fed back and supplied to parity matrix generator 42" of error correcting code 40'. This means that parity word $P_x$ is generated as a function of the PCM words included in the data block supplied thereto as well as the fed back parity word $R_x$. Likewise, matrix parity word $Q_x$ is generated as a function of the PCM words included in the data block supplied thereto as well as the fed back matrix parity word $S_y$. As a result of this "cross-feeding" of error correcting words between the respective error correcting code generators, errors that may be present in reproduced or received error correcting words $R_y$ and $S_y$ are corrected by using error correcting words $P_x$ and $Q_x$, respectively. Likewise, errors which may be present in reproduced or received error correcting words $P_y$ and $Q_y$ are corrected by using error correcting words $R_y$ and $S_y$. Consequently, since erroneous error correcting words may be corrected, erroneous PCM words which might otherwise be uncorrectable likewise can be corrected. Hence, the error correcting ability of the embodiment shown in FIG. 4 is improved over that for the embodiment shown in FIG. 3.

Figure 5:
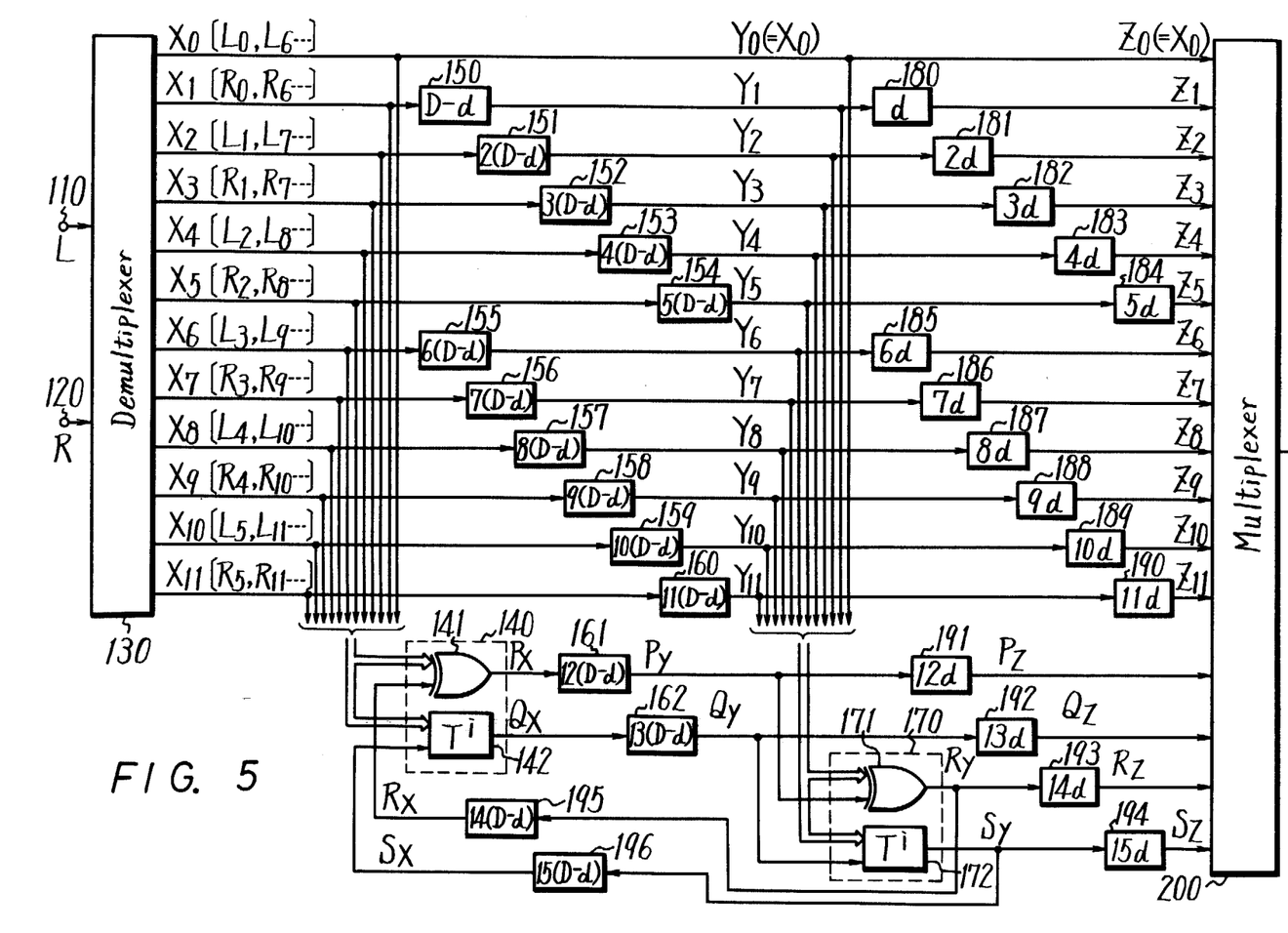

Referring now to FIG. 5, there is illustrated yet another embodiment of the present invention. In FIG. 5, those elements which are similar to aforedescribed elements are identified with like reference numerals commencing with the prefix "1". It is seen that error correcting code generator 170 is supplied with error correcting words $P_y$ and $Q_y$, derived from error correcting code generator 140, and error correcting code generator 140 is supplied with error correcting words $R_x$ and $S_x$, both derived from error correcting code generator 170. This "cross-feeding" of error correcting words is, thus, similar to the cross-feeding described hereinabove with respect to the embodiment of FIG. 4.

In the FIG. 5 embodiment, distributing circuit 130 is supplied with successive left-channel PCM words via input terminal 110 and successive right-channel PCM words via input terminal 120. Channels $X_0 \ldots X_{11}$ are coupled to delay circuits 150, 151 . . . 160 and, as before, these channels also are coupled to parity word generator 141 and to matrix parity generator 142, both included in error correcting code generator 140. Delay circuits 150 . . . 160 differ from aforedescribed time delay circuits 52 . . . 63 in the amount of time delay imparted thereby. Also, it is seen that, in FIG. 5, no delay is imparted to the PCM words in channel $X_0$.

Channel $X_1$ is coupled to delay circuit 150, resulting in a delay of (D−d) imparted to PCM words $R_0, R_6, R_{12}$ . . . . Channel $X_2$ is coupled to delay circuit 151, resulting in a time delay 2(D−d) imparted to PCM words $L_1, L_7, L_{13}, \ldots$ . In similar fashion, the PCM words in channels $X_3 \ldots X_{11}$ are subjected to time delays by delay circuits 152 . . . 160, respectively, each such time delay being equal to a respective multiple of (D−d), wherein D is equal to a data word time period, and d is a predetermined fraction (e.g. D/8) of D. It is appreciated that delay circuits 150 . . . 160 serve to time-interleave the PCM words, resulting in a time-interleaved data block formed of the PCM words provided in channels $Y_0 \ldots Y_{11}$. As mentioned above, the PCM words in channel $X_0$ are not subjected to any delay.

In the FIG. 5 embodiments, the series of parity words $P_x$ is delayed by delay circuit 161 to produce the delayed parity words $P_y$. This delay is equal to 12(D−d). The series of matrix parity words $Q_x$ are delayed by delay circuit 162 to produce the delayed matrix parity words $Q_y$. Delay circuit 162 imparts a delay of 13(D−d). It is, therefore, seen that delay circuits 150 . . . 162 provide selective delays, each equal to a multiple of (D−d), thereby time-interleaving the PCM and error correcting words so as to form therefrom a time-interleaved data block.

The time-interleaved PCM words provided in channels $Y_0 \ldots Y_{11}$ are supplied both to parity word generator 171 and to parity matrix generator 172, these respective generators also being supplied with delayed parity word $P_y$ and delayed matrix parity word $Q_y$, respectively. Hence, parity word generator 171 generates the series of parity words $R_y$; and parity matrix generator 172 generates the series of matrix parity words $S_y$. Parity words $R_y$ are fed back to parity word generator 141 included in error correcting code generator 140 via delay circuit 195. The delay circuit imparts a delay of 14(D−d), the fed back, delayed parity word being represented as $R_x$. Similarly, matrix parity words $S_y$ are fed back to parity matrix generator 142 via delay circuit 196. This delay circuit imparts a delay of 15(D−d), and the delayed, fedback matrix parity word is identified as $S_x$.

In addition to being supplied to error correcting code generator 170, the time-interleaved PCM words in channels $Y_0 \ldots y_{11}$ are subjected to selected additional time delays by time delay circuits 180 . . . 190. In particular, the PCM words provided in channel $Y_0$ are not subjected to any delay. The PCM words provided in channel $Y_1$ are delayed in time delay circuit 180 by the amount d, the PCM words in channel $Y_2$ are delayed in delay circuit 181 by the amount 2d, and so on, with the PCM words provided in channel $Y_{11}$ delayed in time delay circuit 190 by the amount 11d. It is seen that time delay circuits 180 . . . 190 tend to cancel a portion of the delays imparted by delay circuits 150 . . . 160, respectively, resulting in time-interleaved PCM words in channels $Z_0 \ldots Z_{11}$, each of which exhibits a respective delay that is equal to an integral multiple (0, 1, 2, . . . 11) of data word period D.

Similarly, delayed parity words $P_y$ are delayed in time delay circuit 191 by the amount 12d, the delayed matrix parity words $Q_y$ being delayed in time delay circuit 192 by the amount 13d, parity words $R_y$ being delayed in time delay circuit 193 by the amount 14d and matrix parity words $S_y$ being delayed in time delay circuit 194 by the amount 15d. Time delay circuit 191 tends to cancel a portion of the delay imported by delay circuit 161, resulting in parity words $P_z$ which are delayed by 12D. Time delay circuit 192 tends to cancel a portion of the delay imparted by delay circuit 162, resulting in matrix parity words $Q_z$ delayed by 13D. Similarly, it is seen that time delay circuits 193 and 194 tend to cancel a portion of the delay imparted by delay circuits 195 and 196.

Therefore, multiplexer 200, which may be similar to aforedescribed multiplexer 90, is upplied with a transmission block formed of time-interleaved words. In particular, this transmission block is formed of time-interleaved PCM words in channels $Z_0 \ldots Z_{11}$, together with time-interleaved error correcting words $P_z$, $Q_z$, $R_z$ and $S_z$. Multiplexer 200 serves to serialize the transmission block supplied thereto in parallel-by-word form, resulting in the transmission block depicted in FIG. 2.

It is seen, from the foregoing detailed description, that the various embodiments of the present invention desirably avoid the need for an error detecting code, such as the CRC code. If, however, it is preferred to use this CRC code, so as to identify particular words which may be erroneous during reproduction or reception of the transmission block, the CRC code, or an alternative error detecting code, may be inserted into the transmission block shown in FIG. 2. For example, the CRC code may be inserted in advance of the error correcting words.

By reason of the advantages obtained from the present invention, the error rate (which is less than unity) after kerror correction is markedly improved. That is, the number of errors which can be corrected in accordance with the present invention is greater than the number of errors which heretofore could be corrected. As a result hereof, the number of errors remaining after the error correction operation is far less than that remaining in accordance with prior art techniques. For example, if the word error rate after correction is represented as $P_W$ (this word error rate being less than unity), then, in accordance with the present invention, the word error rate is on the order of about $P_W^8$ to $P_W^{12}$. This compares with prior art techniques which, when using an error detecting code such as the CRC code, exhibit error rates on the order of about $P_W^3$. Thus, it is appreciated that the error correcting ability in accordance with the error correction encoding technique of the present invention is substantially improved.

While the present invention has been particularly shown and described with reference to certain preferred embodiments, it should be readily appreciated to those of ordinary skill in the art that various changes and modifications in form and details may be made without departing from the spirit and scope of the invention. It is intended that the appended claims be interpreted as including such changes and modifications.

What is claimed is:

1. A method of transmitting digital data words, comprising the steps of distributing successive data words to a plurality of respective channels to form successive data blocks, each data block being comprised of the data words in said plural channels; generating a first error correcting code as a function of at least the words included in said data block, said first error correcting code being adapted for use in correcting at least one word which is erroneous in said data block; selectively delaying, by different respective time delays, the data words included in said data block to form a time-interleaved data block comprised of time-interleaved data words; generating a second error correcting code as a function of at least the words included in said time-interleaved data block, said second error correcting code being adapted for use in correcting at least one word which is erroneous in said time-interleaved data block; and combining said first error correcting code, said second error correcting code and said time-interleaved data block to form a transmission block.

2. The method of claim 1 wherein said step of generating a second error correcting code includes the step of using said first error correcting code together with the words in said time-interleaved data block to derive said second error correcting code.

3. The method of claim 1 wherein said step of generating a first error correcting code includes the step of using said second error correcting code together with the words in said data block to derive said first error correcting code.

4. The method of claim 1, wherein said step of generating a first error correcting code comprises generating a first parity word as a function of at least the words included in said data block and generating a first matrix parity word as a function of at least the words included in said data block multiplied by a predetermined generating matrix.

5. The method of claim 4 wherein said predetermined generating matrix are the non-zero elements of a Galois Field.

6. The method of claim 4 wherein said step of generating a second error correcting code comprises generating a second parity word as a function of at least the words included in said time-interleaved data block and generating a second matrix parity word as a function of at least the words included in said time-interleaved data block multiplied by a predetermined generation matrix.

7. The method of claim 6, wherein said step of generating said second parity word generates said second parity word as a function of said words included in said time-interleaved data block and also said first parity word; and said step of generating said second matrix parity word generates said second matrix parity word as a function of said words included in said time-interleaved data block and also said first matrix parity word all multiplied by said predetermined generation matrix.

8. The method of claim 7, wherein said step of generating said first parity word generates said first parity word as a function of said words included in said data block and also said second parity word; and said step of generating said first matrix parity word generates said first matrix parity word as a function of said words included in said data block and also said second matrix parity word all multiplied by said predetermined generation matrix.

9. The method of claim 1, further comprising the step of selectively delaying said first error correcting code after said first code generating step to time-interleave said first error correcting code with said time-interleaved data words in said transmission block.

10. The method of claim 9 wherein each delay imparted to said data words and to said first error correcting code is a multiple of D, wherein D is the time period occupied by each data word in a channel.

11. The method of claim 10, further comprising, after said step of selectively delaying said first error correcting code, the step of additionally delaying alternate time-interleaved data words and error correcting codes included in said transmission block by the amount d, wherein d is a predetermined fraction of D.

12. The method of claim 9 wherein each delay imparted to said data words and to said first error correcting code is a multiple of (D-d), wherein D is the time period occupied by each data word in a channel and d is a predetermined fraction of D.

13. The method of claim 12, further comprising, after said step of selectively delaying said first error correcting code, the step of additionally delaying the time-interleaved data words and error correcting codes included in said transmission block by respective multiples of d.

14. An error-correction encoder for successive PCM words supplied thereto, comprising a plurality of channels; distributing means for distributing successive PCM words to respective ones of said plurality of channels to form successive data blocks, each data block being comprised of the PCM words in said plural channels, first error correcting code means supplied with the PCM words in a data block from said distributed means for generating a first error correcting code as a function of the words included in said data block, said first error correcting code being adapted for use in correcting at least one word which is erroneous in said data block; delay means coupled to receive the PCM words in a data block from said distributing means for selectively delaying, by different respective time delays, said PCM words to form a time-interleaved data block comprised of time-interleaved PCM words; second error correcting code means supplied with said time-interleaved PCM words from said delay means in a time-interleaved data block for generating a second error correcting code as a function of said time-interleaved PCM words, said second error correcting code being adapted for use in correcting at least one word which is erroneous in said time-interleaved data block; and means for combining said first error correcting code, said second error correcting code and said time-interleaved data block to form a transmission block.

15. The encoder of claim 14, wherein said first error correcting code means comprises first parity generating means supplied with at least the words included in said data block for generating a first parity word in response thereto, and first parity matrix generating means supplied with at least the words included in said data block for generating a first matrix parity word in response to the multiplication of said words with a predetermined generating matrix.

16. The encoder of claim 15 wherein said predetermined generating matrix are the non-zero elements of a Galois Field.

17. The encoder of claim 15 wherein said second error correcting code means comprises second parity generating means supplied with at least the words included in said time-interleaved data block for generating a second parity word in response thereto, and second parity matrix generating means supplied with at least the words included in said time-interleaved data block for generating a second matrix parity word in response to the multiplication of said time-interleaved words with a predetermined generation matrix.

18. The encoder of claim 17, further comprising means coupled to said first parity generating means for supplying said first parity word to said second parity generating means, and means coupled to said first parity matrix generating means for supplying said first matrix parity word to said second parity matrix generating means.

19. The encoder of claim 18, further comprising means coupled to said parity generating means for supplying said second parity word to said first parity generating means, and means coupled to said second parity matrix generating means for supplying said second matrix parity word to said first parity matrix generating means.

20. The encoder of claim 14, further comprising error correcting code delay means coupled to said first error correcting code means for selectively delaying said first error correcting code to time-interleave said first error correcting code with said time-interleaved PCM words in said transmission block.

21. The encoder of claim 20 wherein each delay imparted to said PCM words and to said first error correcting code is a multiple of D, wherein D is the time period occupied by each PCM word in a channel.

22. The encoder of claim 21, further comprising additional delay means coupled to said delay means and said first and second error correcting code means for additionally delaying alternate time-interleaved PCM words and error correcting codes included in said transmission block by the amount d, wherein d is a predetermined fraction of D.

23. The encoder of claim 20 wherein each delay imparted to said PCM words and to said first error correcting code is a multiple of (D−d), wherein D is the time period occupied by each PCM word in a channel and d is a predetermined fraction of D.

24. The encoder of claim 23, further comprising additional delay means coupled to said delay means and said first and second error correcting code means for additionally delaying the time-interleaved PCM words and error correcting codes included in said transmission block by respective multiples of d.

25. The encoder of claim 14, wherein said data block and said time-interleaved data block each is comprised of parallel-by-word PCM words.

* * * * *